United States Patent [19]

Gottschalk et al.

[11] 4,079,239
[45] Mar. 14, 1978

[54] WHITE BAR ENHANCEMENT FOR UNIVERSAL PRODUCT CODE

[75] Inventors: Juan M. Gottschalk, Elkins Park; Arnold H. Nicodemus, Lansdale, both of Pa.

[73] Assignee: Sperry Rand Corporation, New York, N.Y.

[21] Appl. No.: 688,510

[22] Filed: May 20, 1976

[51] Int. Cl.² .................. G06K 7/10; G08C 9/06; H03K 9/08
[52] U.S. Cl. .................... 235/463; 250/568; 329/106; 340/146.3 Z
[58] Field of Search ............ 235/61.11 E, 61.11 D; 340/146.3 F, 146.3 Z; 250/555, 566, 568, 569; 329/106; 360/37, 38

[56] References Cited

U.S. PATENT DOCUMENTS

| | | |
|---|---|---|
| 3,890,597 | 6/1975 | Hanchett .................. 235/61.11 E |
| 3,893,077 | 7/1975 | Myren .................... 340/146.3 F |
| 3,916,154 | 10/1975 | Hare et al. .............. 235/61.11 E |
| 4,000,397 | 12/1976 | Hebert et al. ............ 235/61.11 E |

*Primary Examiner*—Daryl W. Cook
*Attorney, Agent, or Firm*—Rene A. Kuypers

[57] ABSTRACT

The invention pertains to an optical scanning system which is capable of reading the UPC (Universal Product Code) symbol, which is printed out of tolerance because the black bars are too wide and the white spaces are too narrow. The system provides an arrangement for selecting any one of three (3) modes of operation, wherein two (2) of the modes provide white space enhancement (a narrowing of the signals representative of the width of the black bars and a widening of the signals representative of the white spaces) and one (1) mode provides no enhancement at all.

6 Claims, 4 Drawing Figures

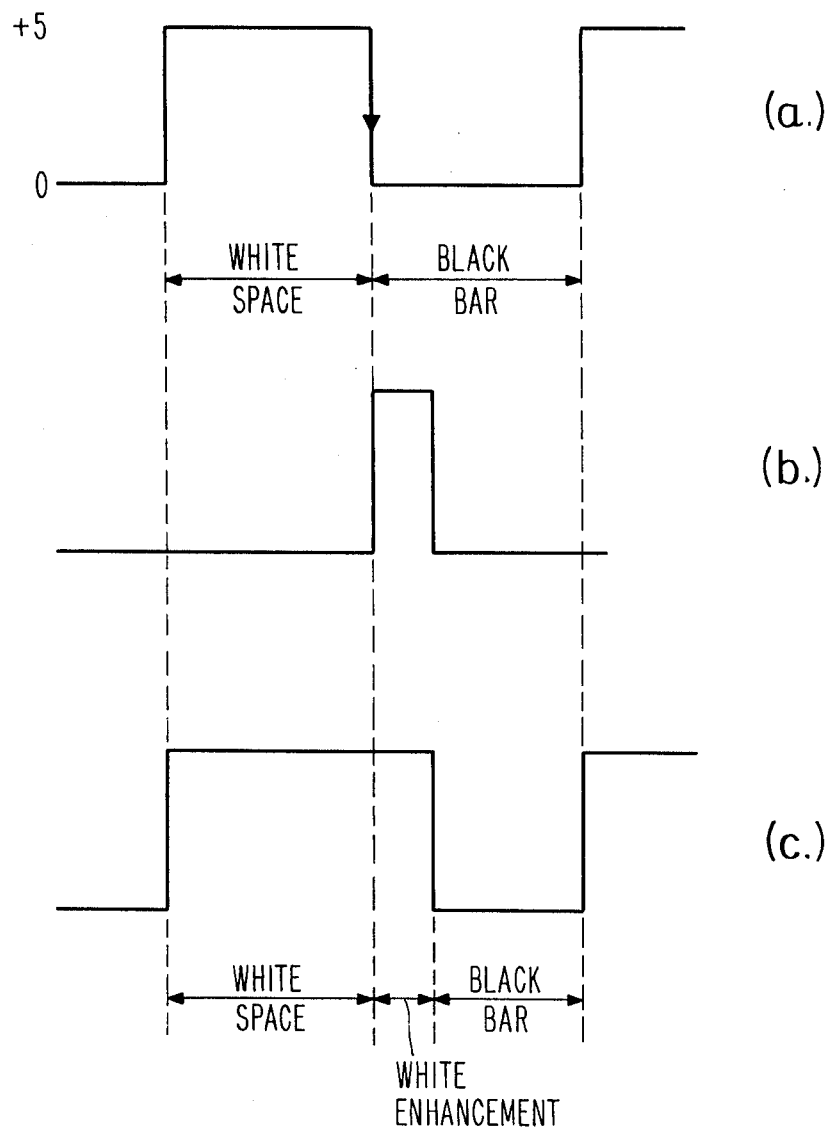

WHITE BAR ENHANCEMENT FOR UNIVERSAL PRODUCT CODE

BACKGROUND OF THE INVENTION

1. Field of the Invention

This invention relates to the field of optical scanning and in particular to the field of optical scanning of the UPC symbol.

2. Description of the Prior Art

In the known prior art of optical scanning of UPC (Universal Product Code) symbols, which are composed of alternating black and white bars to form a code, it is known that the nature of the optical scanning system which is utilized to read the code tended to discriminate against the white bars over the black bars. Accordingly, equalization circuits were utilized into the signal processing circuitry to remedy this problem.

In a dissimilar art such as systems that read magnetic information on tape, it is well-known that if the information cannot be properly read from the tape when the read circuits are at a nominal gain setting, the system will automatically switch to increase gain and a read cycle will again be tried. However, if too much noise is introduced into the read circuitry by the increased gain so that a read operation cannot be accomplished, then the gain is reduced to below nominal and a read cycle is again attempted. Hopefully, this third alternative permits a successful read to take place.

It is to be noted in the above magnetic read system that the different gains that are introduced are linear changes as opposed to non-linear changes in this invention.

SUMMARY OF THE INVENTION

The instant invention pertains to an optical scanning system which allows a selection of one out of three possible modes of operation wherein two of the modes are utilized to read the UPC symbol which is printed with the black bars out of tolerance by being too wide. The selection of mode (1) enables the system to provide a continuous white enhancement (i.e., a narrowing of the signals representing the black bars and widening of the signals representing the white spaces) for every scan of the symbol, whereas mode (2) causes the system to operate so that a white enhanced scan is followed by a non-white enhanced scan. Mode (3) does not provide for any enhancement and the digital signals from the label scan are fed through the system without any changes whatsoever.

BRIEF DESCRIPTION OF THE DRAWINGS

FIG. 2a depicts a portion of the pulse train read by the optical scanner of the UPC symbol which is out of tolerance (i.e. the white space should be twice the width of the black bar).

FIG. 2b is a generated signal producd by the disclosed circuitry.

FIG. 2c is a resultant signal produced by the disclosed circuitry caused by adding the signals of FIGS. 2a and 2b.

Referring now to FIG. 1, it is shown that the output of the switch 15 is directed into the B terminal of the one-shot monostable multivibrator 16. This multivibrator is designated as type 74123 made by Texas Instrument and is adjustable to provide an output pulse between 50–1,000 nanoseconds.

The second input to the multivibrator 16 (terminal A) is the pulse train comprising the digital readout of the information comprising a UPC label which emanates from the signal processor 6. This digital signal from the label readout is represented by a pulse train comprising alternating pulses having a voltage level of +5 volts and separated by the absence of pulses having a voltage level of zero volts or ground potential. FIG. 2a shows a small portion of the pulse train by way of example. The +5 voltage pulse of FIG. 2a represents a white space, and the zero potential or absence of a pulse represents a black bar of the UPC label.

For purposes of discussion, FIG. 2a represents the pulse train representing a label readout wherein the white spaces are undersized and the black bars are oversized (the white spaces should be twice as wide as the black bars). As is understood, the UPC code may have different sized widths of the bars and spaces. A problem is encountered frequently in the printing of the UPC label because the printing takes place on non-glossy paper which permits the ink to spread. Consequently, the black bars are printed too wide and out of tolerance and the white spaces are therefore undersized. The circuit shown in FIG. 1 remedies the above mentioned problem.

Figure 1:
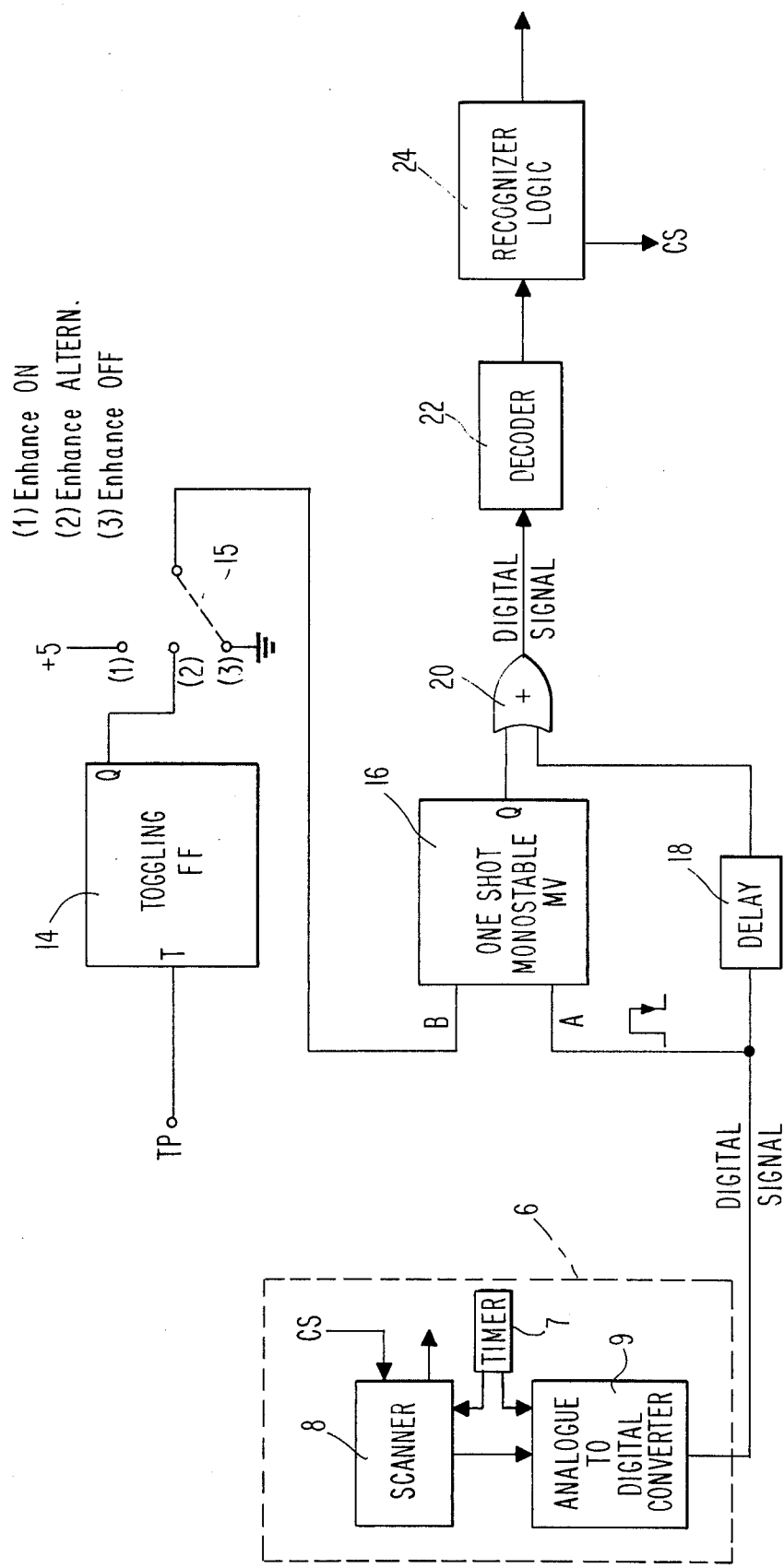
FIG. 1 shows the circuitry utilized for providing three (3) modes of operation in the reading of a UPC symbol.

Let us assume that the switch 15 in FIG. 1 is in the (3) or ground potential position. This potential which is applied to terminal B causes the multivibrator 16 to be disabled. Therefore, when a UPC label is about to be read, the operator draws the item bearing the label across an infra red light beam (not shown) which causes the laser optical X scanner shutter (not shown) to open and a laser beam to scan the label. The laser optical X scanning apparatus may be of the type shown in U.S. 3,818,444. A digital pulse train (FIG. 2a) is therefore generated via the signal processor 6. The pulse train emanates from the analogue/digital converter 9 and passes through the delay 18 to the positive OR gate 20. The delay 18 is identified as type 7432 and has a fixed delay of approximately 30 nanoseconds. The delay does not affect the operation of the presently described mode of operation to any extent and therefore the original pulse train is transmitted from the positive OR gate 20 and into the decoder 22 slightly delayed.

The pulse train is decoded by decoder 22 and directed into the recognizer logic 24. The recognizer logic may be designed by those skilled in the art in accordance with the teachings set forth in the publication "The Characteristics and Decodability of the Universal Product Code", IBM Systems Journal, Vol. 14, No. 1, 1975, p 61. Therefore if a successful read is obtained as determined by the decoder 22 and the recognizer logic 24, a CS (close shutter) signal is produced which is received by the scanner 8. The CS signal closes the scanner shutter and the scanner 8 is ready to scan the next grocery item. As can be appreciated, when the switch 15 is in position (3) no white enhancement occurs and the system operates normally.

When the switch 15 is switched to position (2), the system operation is initiated by the TP pulse. The TP pulse originates in the scanner 8 and is produced at the beginning of each complete laser X scan of the label which occurs every 2.8 milliseconds. In actuality, the TP pulse is produced by the laser beam passing over a silicon photodetector (not shown) within the scanner prior to the beginning of each X scan.

The TP signal is applied to the T input of the toggle flop 14, which is a bi-stable type flip-flop. Let us assume the toggle flop is in the state wherein its Q output is low (L). The toggle flop could also be in the state where its Q output is high (H) and the system would work in an identical manner. Therefore, when the TP signals goes momentarily H at the beginning of an X scan the flip-flop 14 is toggled so that its output Q goes H or +5 volts. The H output of Q is applied to terminal B of the multivibrator 16. Upon the application of the trailing edge of the positive-to-negative going signal (represented by the arrow) of the pulse train (a portion shown in FIG. 2a), which represents the signal read from the label applied to terminal A of the multivibrator, together with the Q output of the toggle flop 14 applied to terminal B the multivibrator 16 is enabled. The enabling of multivibrator 16 produces the pulse shown in FIG. 2b at its output terminal Q. The Q output of the multivibrator 16 is applied as one of the inputs to the positive OR gate 20, whereas the second input to the gate 20 is the pulse train or digitized signal from the analogue/-digital converter 9 via the delay 18. Therefore, when the signals of FIGS. 2a and 2b are buffed together by the OR gate 20 it has the effect of adding the two signals together which results in the pulse train of FIG. 2c. The effect of this is to widen or provide a fixed length addition to the signals representing the white spaces (i.e. provide white enhancement) and narrow the output representing the black bars. The resulting pulse train of FIG. 2c meets the requirements of a nominal or correct read signal wherein the signal representing the white space is twice the width of the signal representing the black bar. The delay 18 is necessary in this case to compensate for the transition time of the multivibrator 16. If the decoder 22 and recognizer logic 24 are able to provide a successful read of the pulse train of FIG. 2c, a CS (close shutter) signal is produced and the system is ready to scan the next grocery item, which has a label. However, if perchance white augmentation was not necessary because the UPC label was correctly printed, at the beginning of the next scan another TP pulse will be produced. It should be noted that since a full scan occurs every 2.8 milliseconds, many scans of a UPC label occur for every passing of the label over the X shaped opening of the scanner. The next TP pulse toggles the toggle flop 14 which causes its Q output to go L. The L output applied to input terminal B disables the multivibrator so that no output signal is produced at its output Q.

The digitized signal (FIG. 2a) is therefore passed through the delay 18 and is applied to the OR gate 20. Since the multi-vibrator is disabled, there will be no addition to the signal shown in FIG. 2a and this original digitized signal is transmitted to the input of the decoder 22 without enhancement. If a successful decode or read occurs in the decoder 22 which is recognizable by the recognizer circuit 24, a CS signal is produced which indicates that a successful read has occurred.

When the switch 15 is in the (2) position, the system operates so that it cycles between two states, namely, providing white enhancement and no white enhancement. By cycling between these two states a valid or successful read is likely to occur because it remedies the situation that occurs most frequently, namely, the UPC label is printed with the black bars too wide due to the spreading of printers ink. However, if the UPC label is printed correctly, the system will provide a normal read when no white enhancement is added.

It should also be noted that it is of no consequence whether the cycling occurs in the order of providing enhancement first or last, which is a function of the last state of the toggle flop 14, since many scans occur during the passing of the item past the scanner. Therefore, since terminal (2) of switch 15 enables the system to cycle many times between enhancement and no enhancement, a successful read will be possible between these two alternatives.

When the switch 15 is turned to the (1) position, a constant +5 volts is applied to the B terminal of the multivibrator 16. Therefore, on the trailing edge of each pulse of the data train (FIG. 2a) applied to terminal A of the multivibrator a positive pulse (FIG. 2b) will be generated. The output Q of multivibrator 16 and the delayed digital data train will be buffed together so that these two signals will be added together to form FIG. 2c. Accordingly, it can be appreciated that when the switch 15 is in position 1, the white enhancement of the data train is always present.

If the white enhanced signal is successfully decoded by decoder 22 and recognized by the logic 24, a CS signal will be generated to close the optical shutter of scanner 8 and the scanner is ready for the next item.

The (1) position of switch 15 is useful if each UPC label of the item to be read has oversized or out-of-tolerance black bars. In any event, the system disclosed provides for no white enhancement, alternative white and no enhancement, and continuous white enhancement.

A timer 7 is also provided so that if no CS signal is produced the scanner will automatically be turned off or timed out. In other words, it is required because of governmental standards and the safety of the operaor that the laser scanner be operative for only a short time. The timer 7 is comprised of a one-shot multivibrator which is enabled when the optical shutter is opened and disabled after two seconds thereby causing the shutter to be closed. When no CS signal is produced and the scanner times out, it indicates that the label on the grocery item is defective.

What is claimed is:

1. Scanning apparatus comprising:
    a. means for scanning a coded symbol formed of a group of indicia and wherein a space is interposed between two consecutive indicia, said indicia and space being formed within a certain tolerance range;
    b. means coupled to said scanning means for producing electrical signals distinguishing said indicia from said space;
    c. means for generating a non-linear signal;
    d. means for combining said non-linear and said electrical signals when said indicia and space are out of tolerance, said combination of signals effectively bringing said indicia and space within said tolerance range.

2. Scanning apparatus comprising:
    a. means for scanning a coded symbol formed by a group of indicia and spaces wherein a space is interposed between two consecutive indicia, said indicia and spaces being formed within a certain tolerance range;

b. means coupled to said scanning means for producing electrical signals distinguishing said indicia from said spaces;
c. means for providing first and second modes of operation in said scanning apparatus;
d. means for generating a non-linear signal;
e. means, in the first mode of operation, for combining said non-linear signal and the electrical signals to effectively bring the indicia and spaces within tolerance, and
f. means in the second mode of operaton, for empolying only the read signal which corresponds to the indicia and spaces within tolerance;
g. means for interpreting said read signal in said first and second modes of operation.

3. The apparatus in accordance with claim 2 wherein selection means are additionally provided for applying a continuous non-linear signal with said electrical signals to said combining means.

4. The apparatus in accordance with claim 2 wherein selection means are additionally provided for preventing a non-linear signal from being applied together with said electrical signals to said combining means.

5. The method of interpreting a symbol comprising bars and spaces with a scanner device comprising the steps of, a. producing an electrical read signal corresponding to said scanned symbol;
b. said read signal required to be within a certain tolerance range;
c. providing consecutive first and second modes of operation;
d. generating a non-linear signal for use in the first mode of operation;
e. combining, in the first mode of operating, said non-linear signal with said read signal to enable an out-of-tolerance read signal to be brought within tolerance, and employing, in the second mode of operation, only the read signal which corresponds to the indicia and spaces that are within tolerance,
f. decoding said read signal in said first and second modes of operation.

6. Scanning apparatus comprising:
a. means for optically scanning a symbol comprising bars and spaces and for generating electrical readout signals corresponding to said bars and spaces,
b. means coupled to said scanning means for processing said readout signals,
c. means included in said processing means for altering said signals to effectively widen said spaces and narrow said bars.

* * * * *